(12) United States Patent
Kim et al.

(10) Patent No.: US 10,101,707 B2
(45) Date of Patent: Oct. 16, 2018

(54) METHOD AND APPARATUS FOR CORRECTING DISTORTION OF 3D HOLOGRAM

(71) Applicant: ELECTRONICS AND TELECOMMUNICATIONS RESEARCH INSTITUTE, Daejeon (KR)

(72) Inventors: Tae One Kim, Daejeon (KR); Hyun Eui Kim, Chungcheongbuk-do (KR); Jae Han Kim, Gyeonggi-do (KR); Jin Woong Kim, Daejeon (KR); Kyung Ae Moon, Daejeon (KR); Jin Soo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 303 days.

(21) Appl. No.: 15/004,403

(22) Filed: Jan. 22, 2016

(65) Prior Publication Data

US 2016/0216690 A1     Jul. 28, 2016

(30) Foreign Application Priority Data

Jan. 27, 2015    (KR) .................. 10-2015-0012764

(51) Int. Cl.
*G03H 1/08*     (2006.01)
*G06T 5/00*     (2006.01)
(Continued)

(52) U.S. Cl.
CPC ........... *G03H 1/0808* (2013.01); *G06T 5/006* (2013.01); *G03H 2001/0491* (2013.01);
(Continued)

(58) Field of Classification Search
CPC .... G03H 1/2294; G03H 1/08; G03H 2210/30; G03H 1/2205; G04H 1/0808; G02B 27/22; G06T 15/00; G06T 17/00
(Continued)

(56) References Cited

U.S. PATENT DOCUMENTS

| 2013/0107336 A1* | 5/2013 | Wey ..................... G03H 1/0808 359/9 |
| 2013/0201446 A1* | 8/2013 | Hall ....................... A61B 3/032 351/201 |

(Continued)

FOREIGN PATENT DOCUMENTS

| JP | 2005-242304 A2 | 9/2005 |
| KR | 1020050115560 A | 12/2005 |

(Continued)

OTHER PUBLICATIONS

Zhengyou Zhang; "Flexible Camera Calibration by Viewing a Plane From Unknown Orientations" Published in: Computer Vision, 1999. The Proceedings of the Seventh IEEE International Conference on (vol. 1); pp. 666-673; Sep. 20, 1999-Sep. 27, 1999.

(Continued)

*Primary Examiner* — William R Alexander
*Assistant Examiner* — Tamara Y Washington
(74) *Attorney, Agent, or Firm* — Ladas & Parry LLP

(57) ABSTRACT

Provided is a method and an apparatus for correcting a distortion of a three-dimensional (3D) hologram, in which the method is performed by the apparatus and includes generating a sliced two-dimensional (2D) section of a hologram by slicing the hologram while performing translation in an optical axis direction, obtaining a sharp sliced image of the hologram from a sequence of images of generated sliced 2D sections using a focusing function of a camera, and analyzing a distortion of the obtained sliced image, and (Continued)

using such a method and apparatus may enable correction of a distortion of a 3D hologram independently from a display structure.

16 Claims, 6 Drawing Sheets

(51) Int. Cl.
  *G03H 1/04* (2006.01)
  *G03H 1/22* (2006.01)
(52) U.S. Cl.
  CPC ........... *G03H 2001/0825* (2013.01); *G03H 2001/2247* (2013.01); *G03H 2210/30* (2013.01); *G03H 2210/33* (2013.01); *G03H 2210/454* (2013.01); *G06T 2200/04* (2013.01); *G06T 2207/10028* (2013.01)
(58) Field of Classification Search
  USPC ...................................................... 359/1–35
  See application file for complete search history.

(56) References Cited

U.S. PATENT DOCUMENTS

| | | | |
|---|---|---|---|
| 2014/0192146 A1 | 7/2014 | Park et al. | |
| 2014/0268096 A1* | 9/2014 | Lebow | G01S 17/107 356/4.01 |

FOREIGN PATENT DOCUMENTS

| | | | | |
|---|---|---|---|---|
| KR | 1020070089991 A | | 9/2007 | |
| KR | 1020080097744 A | | 11/2008 | |
| KR | 1020140071638 | * | 4/2012 | ............... G03H 1/04 |
| KR | 1020140071638 A | | 6/2014 | |

OTHER PUBLICATIONS

Jia Jia et al; "Reducing the Memory usage for effective computer-generated hologram calculation using compressed look-up . . . ", Applied Optics, Mar. 2013, 10 pages (pp. 1404-1412).

* cited by examiner

METHOD AND APPARATUS FOR CORRECTING DISTORTION OF 3D HOLOGRAM

CROSS-REFERENCE TO RELATED APPLICATION

This application claims the priority benefit of Korean Patent Application No. 10-2015-0012764, filed on Jan. 27, 2015, in the Korean Intellectual Property Office, the disclosure of which is incorporated herein by reference.

BACKGROUND

1. Field of the Invention

The present invention relates to a method and an apparatus for correcting a distortion of a three-dimensional (3D) hologram.

2. Description of the Related Art

Recently, an interest in hologram display technology is increasing. The hologram display technology is recognized as technology for ultimately optimizing three-dimensional (3D) display.

Other currently developed and commercialized related technologies, for example, autostereoscopic and stereoscopic 3D display technology, and multiview image based 3D display technology, may cause visual fatigue during human visual sensing due to vergence-accommodation conflicts.

A general method of correcting a distortion may include a geometric optics or wave optics based correcting method which is mainly used in an existing field of optics.

However, such a method based on optics parameter information may not completely describe an optical system in an actually implemented display system and thus, may have a restricted performance in correcting a distortion of a hologram.

Thus, hologram display technology that may solve such an issue is expected to take the place of the current 3D display technology.

Accordingly, there is a desire for technology for correcting a distortion in a 3D space of a hologram that may occur due to an optical system of a display when displaying the hologram.

SUMMARY

An aspect of the present invention provides a method and an apparatus for correcting a distortion of a three-dimensional (3D) hologram that may solve all the issues described in the foregoing.

Another aspect of the present invention also provides a method and an apparatus for correcting a distortion of a 3D hologram by obtaining a sliced two-dimensional (2D) image sequence.

Still another aspect of the present invention also provides a method and an apparatus for correcting a distortion of a 3D hologram which are independent from a display structure.

According to an aspect of the present invention, there is provided a method of correcting a distortion of a 3D hologram performed by an apparatus for correcting a distortion of a 3D hologram, the method including generating a sliced 2D section of a hologram by slicing the hologram while performing translation in an optical axis direction, obtaining a sharp sliced image of the hologram from a sequence of images of generated sliced 2D sections using a focusing function of a camera, and analyzing a distortion of the obtained sliced image occurring due to an optical system of a display.

The method may further include generating a computer-generated hologram (CGH) by correcting the analyzed distortion of the sliced image, and displaying the generated CGH as a 3D hologram.

The generating of the sliced 2D section may include generating a sliced section of a designed 2D pattern while translating the 2D pattern in the optical axis direction.

The obtaining of the sliced image may include obtaining a sharp sliced image of the hologram located in a predetermined depth of a 3D space using a lens of the camera having an extremely low depth.

The analyzing of the distortion may include analyzing the distortion by modeling an optical distortion model of the distortion of the sliced image.

The analyzing of the distortion may include analyzing a distortion occurring due to the optical system of the display and a distortion occurring due to an optical system of the camera among distortions of the sliced image.

The generating of the CGH may include generating the CGH by performing inverse modeling using an inverse model of the optical distortion model of the distortion of the sliced image and correcting the distortion of the sliced image.

The generating of the CGH may include generating the CGH by performing pre-undistortion on a distortion of a 3D object present in the sliced 2D section using the inverse model.

The generating of the CGH may include correcting the distortion of the 3D object present in the sliced 2D section using interpolation.

The generating of the CGH may include setting a number of sliced images to be obtained, determining a distance using the set number of the sliced images, and correcting, through the interpolation, a distortion of a remaining sliced section among the sliced 2D sections from which the sliced images are excluded.

According to another aspect of the present invention, there is provided an apparatus for correcting a distortion of a 3D hologram, the apparatus including a sliced 2D section generator configured to generate a sliced 2D section of a hologram by slicing a hologram while performing translation in an optical axis direction, a sliced image acquirer configured to obtain a sharp sliced image of the hologram from a sequence of images of generated sliced 2D sections using a focusing function of a camera, and a distortion analyzer configured to analyze a distortion of the obtained sliced image occurring due to an optical system of a display.

The apparatus may further include a CGH generator configured to generate a CGH by correcting the analyzed distortion of the sliced image, and a distortion corrected 3D hologram reconstructor configured to display the generated CGH as a 3D hologram.

The sliced 2D section generator may generate a sliced section of a designed 2D pattern while translating the 2D pattern in the optical axis direction.

The sliced image acquirer may obtain a sharp sliced image located in a predetermined depth of a 3D space using a lens of the camera having an extremely low depth.

The distortion analyzer may analyze the distortion by modeling an optical distortion model of the distortion of the sliced image.

The distortion analyzer may analyze a distortion occurring due to the optical system of the display and a distortion occurring due to an optical system of the camera among distortions of the sliced image.

The CGH generator may generate the CGH by performing inverse modeling using an inverse model of the optical distortion model of the distortion of the sliced image and correcting the distortion of the sliced image.

The CGH generator may generate the CGH by performing pre-undistortion on a distortion of a 3D object present in the sliced 2D section using the inverse model.

The CGH generator may correct the distortion of the 3D object present in the sliced 2D section using interpolation.

The CGH generator may set a number of sliced images to be obtained, determine a distance using the set number of the sliced images, and correct, through the interpolation, a distortion of a remaining sliced section among the sliced 2D sections from which the sliced images are excluded.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
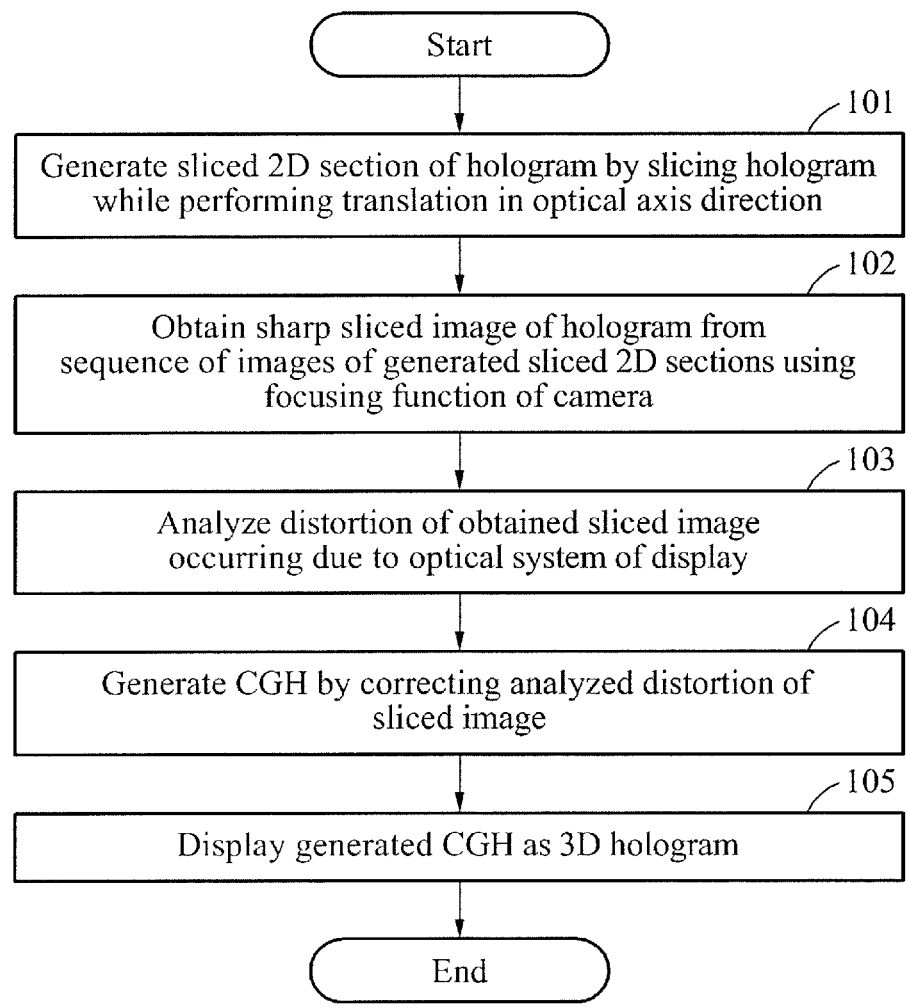
FIG. 1 is a flowchart illustrating a method of correcting a distortion of a three-dimensional (3D) hologram according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a flowchart illustrating a method of correcting a distortion of a three-dimensional (3D) hologram according to an embodiment of the present invention. Hereinafter, the method of correcting a distortion of a 3D hologram will be referred to as a 3D hologram distortion correcting method for simplicity. In addition, an apparatus for correcting a distortion of a 3D hologram will be referred to as a 3D hologram distortion correcting apparatus for simplicity.

Referring to FIG. 1, the 3D hologram distortion correcting method performed by the 3D hologram distortion correcting apparatus includes operations to be described as follows.

In operation 101, the 3D hologram distortion correcting apparatus generates a sliced two-dimensional (2D) section by slicing a hologram while performing translation in an optical axis direction. Here, the 3D hologram distortion correcting apparatus generates a sliced section of a designed 2D pattern while translating the 2D pattern in the optical axis direction.

In operation 102, the 3D hologram distortion correcting apparatus obtains a sharp sliced image of the hologram from a sequence of images of generated sliced 2D sections using a focusing function of a camera.

The 3D hologram distortion correcting apparatus obtains a sharp sliced image located in a predetermined depth of a 3D space using a lens of the camera having an extremely low depth.

In operation 103, the 3D hologram distortion correcting apparatus analyzes a distortion of the obtained sliced image occurring due to an optical system of a display. The 3D hologram distortion correcting apparatus analyzes the distortion by modeling an optical distortion model of the distortion of the sliced image.

In addition, the 3D hologram distortion correcting apparatus analyzes a distortion occurring due to the optical system of the display and a distortion occurring due to an optical system of the camera among distortions of the sliced image.

In operation 104, the 3D hologram distortion correcting apparatus generates a computer-generated hologram (CGH) by correcting the analyzed distortion of the sliced image.

The 3D hologram distortion apparatus generates the CGH by performing inverse modeling using an inverse model of the optical distortion model of the distortion of the sliced image and correcting the distortion of the sliced image. In addition, the 3D hologram distortion apparatus generates the CGH by performing pre-undistortion on a distortion of a 3D object present in the sliced 2D section using the inverse model.

Here, the 3D hologram distortion correcting apparatus corrects a distortion of a 3D object present in the sliced 2D section using interpolation. The 3D hologram distortion correcting apparatus sets a number of sliced images to be obtained, and determines a distance based on the set number of the sliced images, as necessary.

The 3D hologram distortion correcting apparatus corrects, through the interpolation, a distortion of a remaining sliced section among the sliced 2D sections from which the sliced images are excluded.

In operation 105, the 3D hologram distortion correcting apparatus displays the generated CGH as a 3D hologram.

Figure 2:
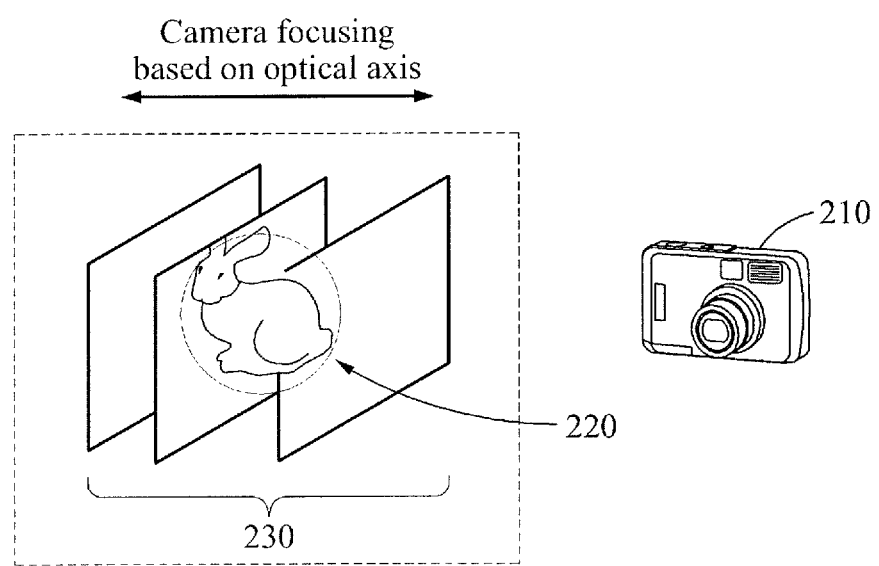
FIG. 2 illustrates an example process of obtaining a sliced two-dimensional (2D) section image according to an embodiment of the present invention.

FIG. 2 illustrates an example process of obtaining a sliced 2D image according to an embodiment of the present invention.

A 3D hologram distortion correcting apparatus may obtain a sliced 2D image of a 3D hologram represented in a 3D space using a focusing function of a camera.

Referring to FIG. 2, the 3D hologram distortion correcting apparatus obtains, using a camera 210, a sliced 2D image by slicing a 3D hologram 220 displayed in a 3D space in an optical axis direction of a display.

The 3D hologram distortion correcting apparatus may analyze a distortion of each sliced image in a sequence 230 of sliced 2D images. The 3D hologram distortion correcting apparatus may display, using a CGH method, a 3D hologram from which the distortion is eliminated based on a result of the analyzing.

The 3D hologram distortion correcting apparatus may obtain the sliced 2D image of the 3D hologram 220 represented in the 3D space by the display. The 3D hologram distortion correcting apparatus may obtain a focal plane image using the focusing function of the camera 210 to obtain a sharpest sliced image without a blur.

In addition, the 3D hologram distortion correcting apparatus may obtain a sliced image of a designed 2D pattern while translating the 2D pattern in the optical axis direction. Here, the 3D hologram distortion correcting apparatus may obtain a sharper hologram pattern image by adjusting a focus of the camera 210.

The 3D hologram distortion correcting apparatus may obtain a sharpest image of an object located in a predetermined depth of the 3D space using a lens having an extremely low depth of field (DOF) and depth by adjusting the focus of the camera 210. Here, the 3D hologram distortion correcting apparatus may translate the 2D pattern in the optical axis direction and finely adjust the focus of the camera 210. The 3D hologram distortion correcting apparatus may obtain a desired sliced image of the 3D hologram 220 with a DOF in a depth direction, not a zero depth.

Figure 3:
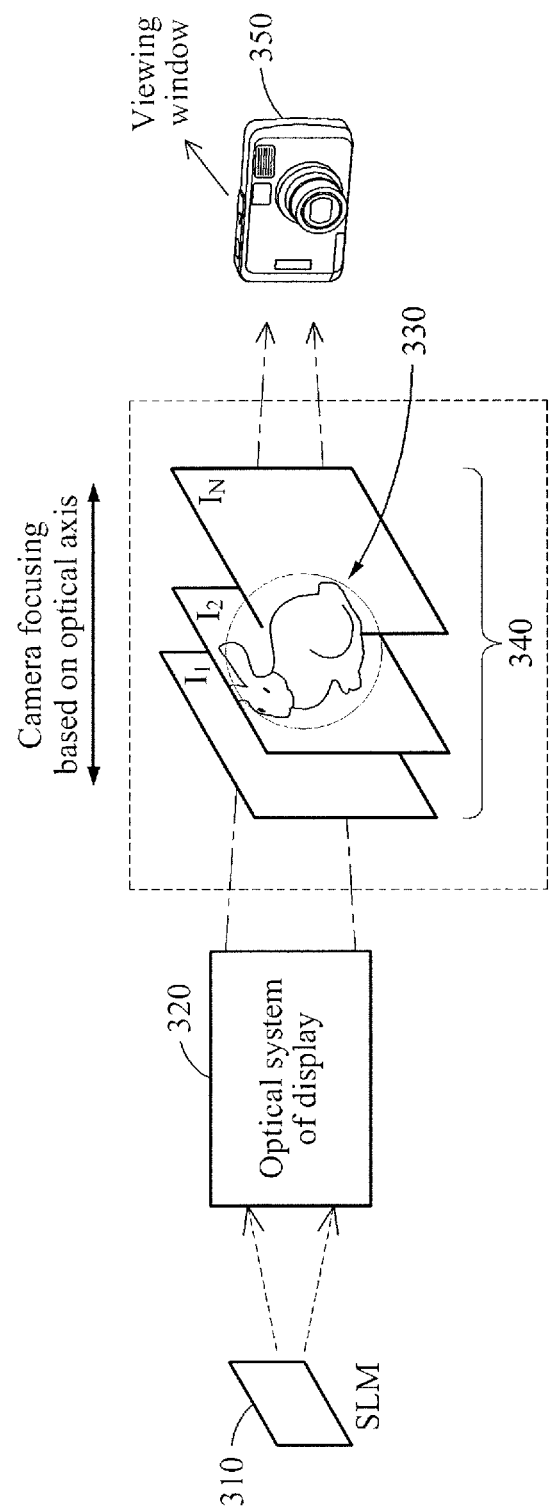
FIG. 3 illustrates an example process of correcting a distortion of a sliced 2D section image according to an embodiment of the present invention.

FIG. 3 illustrates an example process of correcting a distortion of a sliced 2D image according to an embodiment of the present invention.

A 3D hologram distortion correcting apparatus may correct a distortion of a 3D hologram by measuring a distortion of a sliced 2D image of the 3D hologram.

Referring to FIG. 3, the 3D hologram distortion correcting apparatus corrects a distortion of a 3D hologram 330 represented in a 3D space which may occur due to an optical system 320 of a display system. The 3D hologram distortion correcting apparatus may correct the distortion using a camera 350.

The 3D hologram distortion correcting apparatus may obtain, using a focusing function of the camera 350, a sequence 340 of sharp sliced 2D images by slicing the 3D hologram 330 while performing translation in an optical axis direction. The 3D hologram distortion correcting apparatus may analyze, using an image processing method, a distortion of the obtained sliced 2D images occurring due to the optical system 320 of the display system.

The 3D hologram distortion correcting apparatus may display a 3D hologram from which the distortion is eliminated based on a result of the analyzing in combination with a CGH generating method.

Figure 4:
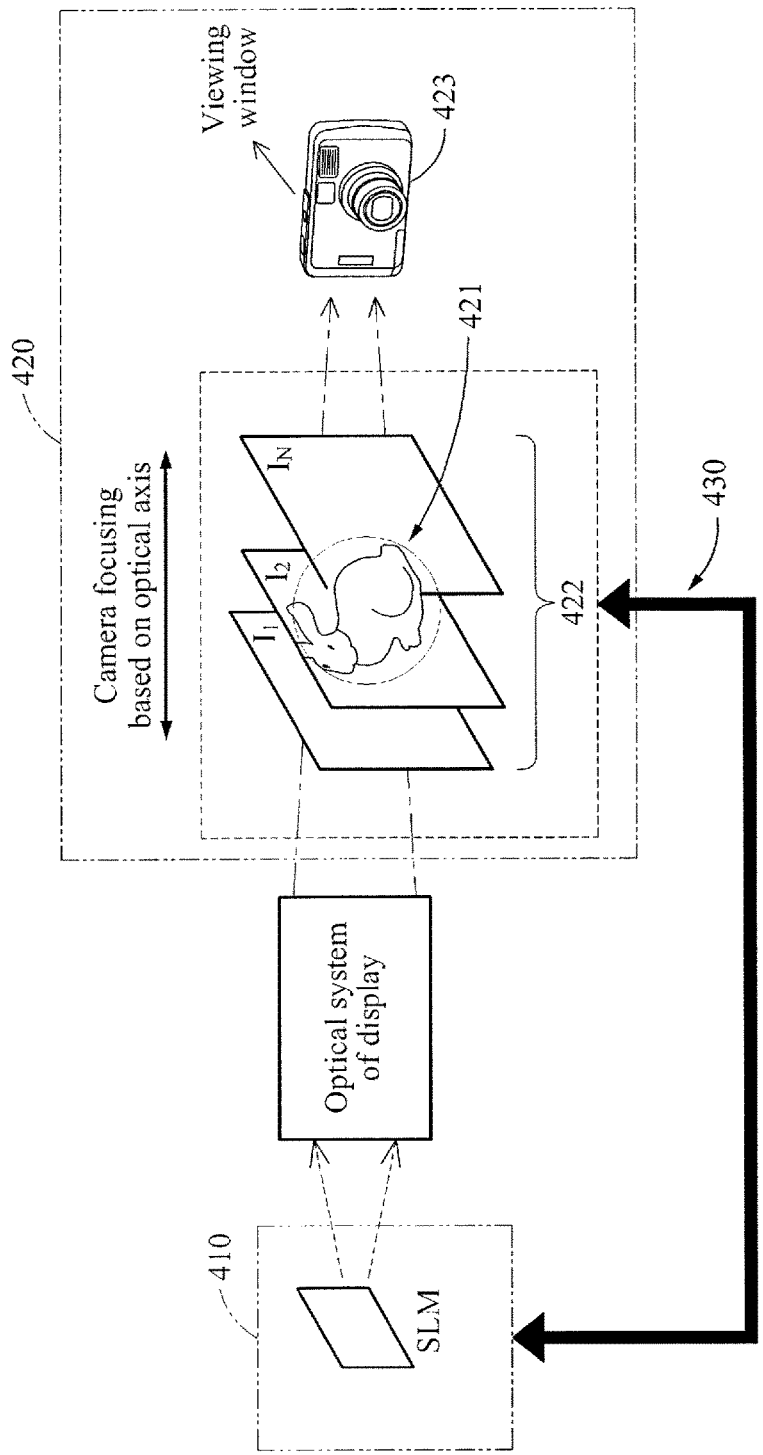
FIG. 4 illustrates an example method of correcting a distortion of a 3D hologram according to an embodiment of the present invention

FIG. 4 illustrates an example of a 3D hologram distortion correcting method according to an embodiment of the present invention.

Referring to FIG. 4, in 420, a 3D hologram distortion correcting apparatus obtains, using a focusing function of a camera 423, a sequence 422 of sliced 2D images, for example, a sliced 2D image $I_1$, a sliced 2D image $I_2$, and a sliced 2D image $I_N$, of a hologram image 421 represented by a spatial light modulator (SLM) and an optical system of a display. The 3D hologram distortion correcting apparatus may obtain the sliced 2D images located in a desired depth from the camera 423. The sliced 2D images to be obtained by the 3D hologram distortion correcting apparatus may be perpendicular to an optical axis.

Here, correcting a distortion occurring due to an optical system of the camera 423 may be performed in advance. For example, the correcting of the distortion occurring due to the optical system of the camera 423 may be performed using a pattern-based camera calibration method. The 3D hologram distortion correcting apparatus may obtain a lens distortion parameter using the camera calibration method.

The 3D hologram distortion correcting apparatus may reconstruct a hologram generated with respect to a planar grid structure including spherical points and grid bars, which is a 3D object loaded to the SLM, by varying a depth from the SLM and sequentially displaying the hologram. In addition, the 3D hologram distortion correcting apparatus may obtain a sliced image of the planar grid structure in each depth. Here, the 3D hologram distortion correcting apparatus may obtain N sharpest sliced images using the focusing function of the camera 423.

The N sliced images obtained by the 3D hologram distortion correcting apparatus may be an image including both the distortion occurring due to the optical system of the display and the distortion occurring due to the optical system of the camera 423.

In 430, the 3D hologram distortion correcting apparatus analyzes the sequence 422 of the obtained N sliced images. The 3D hologram distortion correcting apparatus may perform modeling by fitting a distortion of each sliced image to a pre-obtained optical distortion model. For example, the 3D hologram distortion correcting apparatus may perform modeling on a distortion of a sliced image using a barrel distortion model or a pin-cushion distortion model.

In addition, the 3D hologram distortion correcting apparatus may also analyze a distortion occurring due to the optical system of the camera 423 and present in an initially obtained sliced 2D image. In detail, the 3D hologram distortion correcting apparatus may obtain a distortion model of the optical system of the camera 423 using the camera calibration method. The 3D hologram distortion correcting apparatus may calculate a sequence of sliced 2D images, for example, $I_1'$, $I_2'$, . . . , $I_N'$, on which pre-undistortion is performed for the distortion occurring due to the optical system of the camera 423 by applying an inverse model of the obtained distortion model to the obtained sliced 2D images.

The 3D hologram distortion correcting apparatus may extract circular points present in each sliced image of the calculated sequence of the sliced 2D images $I_1', I_2', \ldots, I_N'$. Here, the circular points may be two-dimensionally projected spherical points. The 3D hologram distortion correcting apparatus may measure the distortion occurring due to the optical system of the display based on the circular points. The 3D hologram distortion correcting apparatus may estimate a distortion model of the planar grid structure through the optical distortion model fitting used to estimate the distortion occurring due to the optical system of the camera 423. The 3D hologram distortion correcting apparatus may use a more complex optical distortion model than the optical distortion model described herein, as necessary.

The 3D hologram distortion correcting apparatus may perform pre-undistortion on a distortion of a 3D object present in each sliced section of the 3D hologram 421 using an inverse model of the estimated distortion model. In 430, the 3D hologram distortion correcting apparatus may compensate for an entire distortion of the 3D hologram 421 to be actually displayed.

The 3D hologram distortion correcting apparatus may generate a CGH at each location or a CGH of an object for which a distortion is corrected while translating the planar grid structure in an optical axis, for example, a Z-axis, to measure a distortion of a sliced 2D image. In 410, the 3D hologram distortion correcting apparatus may load the generated CGH to the SLM to display a hologram.

In detail, the 3D hologram distortion correcting apparatus may eliminate a distortion from a hologram to be finally displayed by receiving information on a distortion model of a sliced image which is calculated at each location of the optical axis and performing pre-undistortion on the distortion of the hologram at each location of the optical axis.

Figure 5:
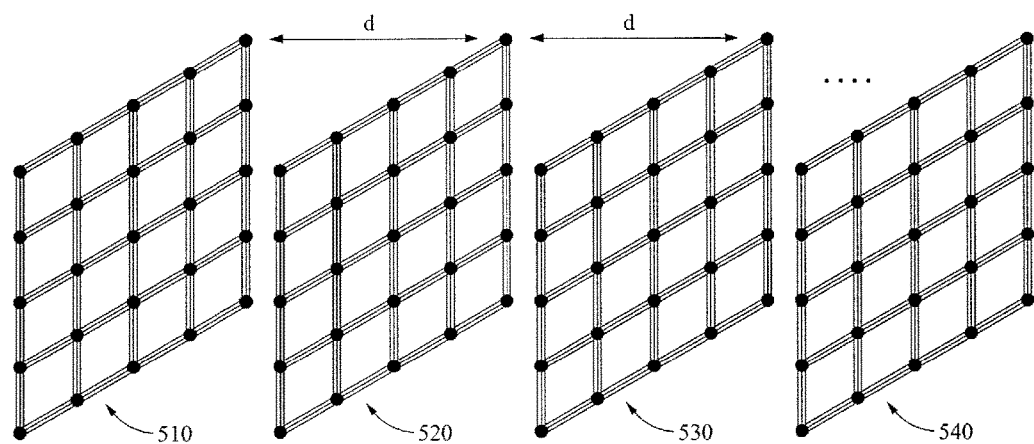
FIG. 5 illustrates an example process of measuring a distortion of a 3D hologram according to an embodiment of the present invention.

FIG. 5 illustrates an example process of measuring a distortion of a hologram according to an embodiment of the present invention.

Referring to FIG. 5, a planar grid structure and a planar grid object used for measuring a distortion of a hologram are translated, N times, on an optical axis.

A 3D hologram distortion correcting apparatus may obtain N sliced images of a hologram while moving on the optical axis to measure a distortion of a sliced image. Here, "N" may be determined based on a parameter setting value of a display such as an SLM to desirably generate a CGH. A set value may be used as a sampling distance from a Z-axis direction of a 3D computer graphics (CG) object to be input.

As illustrated in FIG. 5, a distance (d) between a first grid 510 and a second grid 520 may be equal to a distance (d) between the second grid 520 and a third grid 530. Also, a distance between an N−1th grid and an N-th grid 540 may be equal to the distances.

The 3D hologram distortion correcting apparatus may perform image measurement by a number of times far less than "N," and correct, using interpolation, distortions at remaining locations from which the image measurement is excluded, when generating the CGH.

Figure 6:
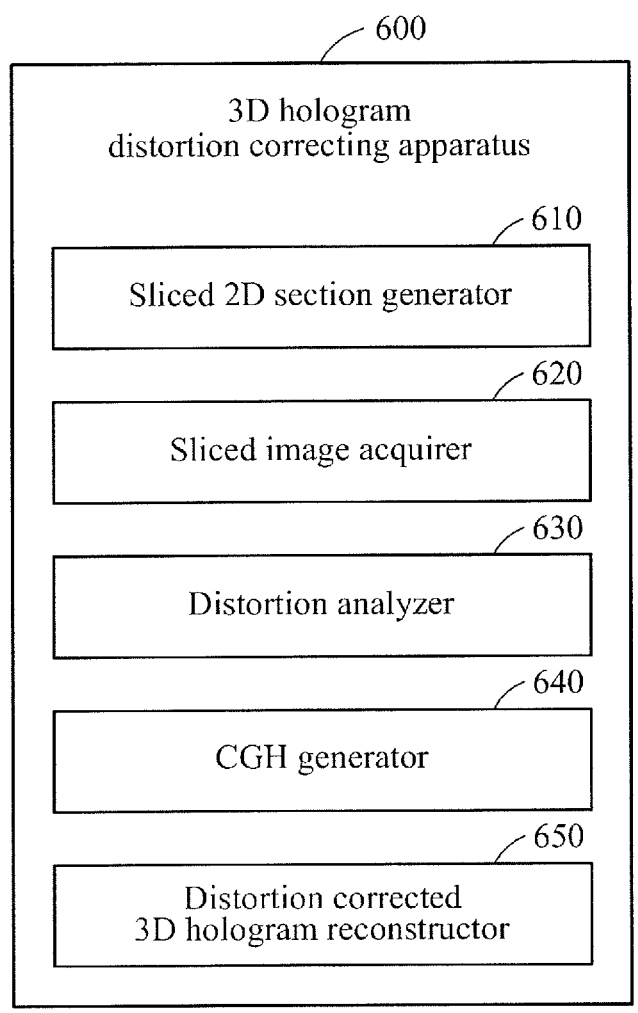
FIG. 6 is a diagram illustrating an apparatus for correcting a distortion of a 3D hologram according to an embodiment of the present invention.

FIG. 6 is a diagram illustrating a 3D hologram distortion correcting apparatus 600 according to an embodiment of the present invention.

Referring to FIG. 6, the 3D hologram distortion correcting apparatus 600 includes a sliced 2D section generator 610, a sliced image acquirer 620, a distortion analyzer 630, a CGH generator 640, and a distortion corrected 3D hologram reconstructor 650. The 3D hologram distortion correcting apparatus 600 may be a computing device including at least one of a processor, a memory, and a data transceiver, but is not limited thereto. The sliced 2D section generator 610, the sliced image acquirer 620, the distortion analyzer 630, the CGH generator 640, and the distortion corrected 3D hologram reconstructor 650 may include at least one of the processor, the memory, and the data transceiver. In addition, the sliced 2D section generator 610, the sliced image acquirer 620, the distortion analyzer 630, the CGH generator 640, and the distortion corrected 3D hologram reconstructor 650 may include a sensor, an electronic circuit, an electric circuit, and an integrated circuit, but is not limited thereto.

The sliced 2D section generator 610 may generate a sliced 2D section by slicing a hologram while performing translation in an optical axis direction. The sliced 2D section generator 610 may generate a sliced section of a designed 2D pattern while translating the 2D pattern in the optical axis direction.

The sliced image acquirer 620 may obtain a sharp sliced image of the hologram from a sequence of images of generated sliced 2D sections using a focusing function of a camera. The sliced image acquirer 620 may obtain a sharp sliced image located in a predetermined depth in a 3D space using a lens of the camera having an extremely low depth.

The distortion analyzer 630 may analyze a distortion of the obtained sliced image that may occur due to an optical system of a display. The distortion analyzer 630 may analyze the distortion by modeling an optical distortion model of the distortion of the sliced image.

In addition, the distortion analyzer 630 may analyze a distortion occurring due to the optical system of the display and a distortion occurring due to an optical system of the camera among distortions of the sliced image.

The CGH generator 640 may generate a CGH by correcting the analyzed distortion of the sliced image. The CGH generator 640 may generate the CGH by performing inverse modeling using an inverse model of the optical distortion model of the distortion of the sliced image and correcting the distortion of the sliced image.

The CGH generator 640 may generate the CGH by performing pre-undistortion on a distortion of a 3D object present in the sliced 2D section using the inverse model.

Here, the CGH generator 640 may correct the distortion of the 3D object present in the sliced 2D section using interpolation. The CGH generator 640 may set a number of sliced images to be obtained, and determine a distance using the set number of the sliced images. The CGH generator 640 may correct, through the interpolation, a distortion of a remaining sliced section among the sliced 2D sections from which the sliced images are excluded.

The distortion corrected 3D hologram reconstructor 650 may display the generated CGH as a 3D hologram.

According to example embodiments, a 3D hologram distortion correcting apparatus may not use geometric optics-based or wave optics-based optical system analysis, but obtain a sequence of sliced 2D images irrespective of description of an optical system and simply correct a distortion of a hologram.

The 3D hologram distortion correcting apparatus may capture a hologram image displayed by a display using a camera and correct a distortion of a hologram through inverse calibration when generating a CGH and thus, may be independent from a structure of the display.

According to example embodiments, a 3D hologram distortion correcting apparatus and method may correct a distortion of a hologram by obtaining a sequence of images of sliced 2D sections.

Thus, the 3D hologram distortion correcting apparatus and method may correct the distortion of the hologram independently from a display structure.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of correcting a distortion of a three-dimensional (3D) hologram performed by an apparatus for correcting a distortion of a 3D hologram, the method comprising:
    generating a sliced two-dimensional (2D) section of a hologram by slicing the hologram while performing translation in an optical axis direction;
    obtaining a sliced image of the hologram from a sequence of images of generated sliced 2D sections using a focusing function of a camera;
    analyzing a distortion of the obtained sliced image occurring due to an optical system of a display; and
    generating a computer-generated hologram (CGH) by correcting the analyzed distortion of the sliced image,
    wherein the analyzing is configured to set a number of sliced images to be obtained, determine a distance using the set number of the sliced images, and correct, through the interpolation, a distortion of a remaining sliced section among the sliced 2D sections from which the sliced images are excluded.

2. The method of claim 1, further comprising:
    displaying the generated CGH as a 3D hologram.

3. The method of claim 1, wherein the generating of the sliced 2D section comprises:
    generating a sliced section of a designed 2D pattern while translating the 2D pattern in the optical axis direction.

4. The method of claim 1, wherein the obtaining of the sliced image comprises:
    obtaining a sliced image located in a predetermined depth of a 3D space using a lens of the camera.

5. The method of claim 1, wherein the analyzing of the distortion comprises:
    analyzing the distortion by modeling an optical distortion model of the distortion of the sliced image.

6. The method of claim 5, wherein the analyzing of the distortion comprises:
    analyzing a distortion occurring due to the optical system of the display and a distortion occurring due to an optical system of the camera among distortions of the sliced image.

7. The method of claim 1, wherein the generating of the CGH comprises:
    generating the CGH by performing inverse modeling using an inverse model of an optical distortion model of the distortion of the sliced image and correcting the distortion of the sliced image.

8. The method of claim 7, wherein the generating of the CGH comprises:
    generating the CGH by performing pre-undistortion on a distortion of a 3D object present in the sliced 2D section using the inverse model.

9. An apparatus for correcting a distortion of a three-dimensional (3D) hologram, the apparatus comprising:
    a sliced two-dimensional (2D) section generator configured to generate a sliced 2D section by slicing a hologram while performing translation in an optical axis direction;
    a sliced image acquirer configured to obtain a sliced image of the hologram from a sequence of images of generated sliced 2D sections using a focusing function of a camera;
    a distortion analyzer configured to analyze a distortion of the obtained sliced image occurring due to an optical system of a display; and
    a computer-generated hologram (CGH) generator configured to generate a CGH by correcting the analyzed distortion of the sliced image,
    wherein the CGH generator is configured to set a number of sliced images to be obtained, determine a distance using the set number of the sliced images, and correct, through the interpolation, a distortion of a remaining sliced section among the sliced 2D sections from which the sliced images are excluded.

10. The apparatus of claim 9, further comprising:
    a distortion corrected 3D hologram reconstructor configured to display the generated CGH as a 3D hologram.

11. The apparatus of claim 9, wherein the sliced 2D section generator is configured to generate a sliced section of a designed 2D pattern while translating the 2D pattern in the optical axis direction.

12. The apparatus of claim 9, wherein the sliced image acquirer is configured to obtain a sliced image located in a predetermined depth of a 3D space using a lens of the camera.

13. The apparatus of claim 9, wherein the distortion analyzer is configured to analyze the distortion by modeling an optical distortion model of the distortion of the sliced image.

14. The apparatus of claim 13, wherein the distortion analyzer is configured to analyze a distortion occurring due to the optical system of the display and a distortion occurring due to an optical system of the camera among distortions of the sliced image.

15. The apparatus of claim 9, wherein the CGH generator is configured to generate the CGH by performing inverse modeling using an inverse model of an optical distortion model of the distortion of the sliced image and correcting the distortion of the sliced image.

16. The apparatus of claim 15, wherein the CGH generator is configured to generate the CGH by performing pre-undistortion on a distortion of a 3D object present in the sliced 2D section using the inverse model.

* * * * *